United States Patent [19]

Robinson

[11] 3,864,316

[45] Feb. 4, 1975

[54] SOLID EPOXY RESINS FROM HYDROGENATED BISPHENOLS AND AROMATIC DICARBOXYLIC ACIDS

[75] Inventor: Glenn Clarke Robinson, Lake Jackson, Tex.

[73] Assignee: The Dow Chemical Company, Midland, Mich.

[22] Filed: Feb. 7, 1974

[21] Appl. No.: 440,413

Related U.S. Application Data

[63] Continuation-in-part of Ser. No. 366,389, June 4, 1973.

[52p] U.S. Cl....260/78.4 EP, 117/132 BE, 260/37 EP, 260/75 EP, 260/835
[51] Int. Cl........................ C08g 30/00, C08g 30/10
[58] Field of Search... 260/78.4 EP, 75 EP, 830 TN, 260/835, 2 EP, 2 EP

[56] References Cited

UNITED STATES PATENTS

| | | | |
|---|---|---|---|
| 3,523,143 | 8/1970 | Kwong | 260/835 |
| 3,551,517 | 12/1970 | Dowbenko | 260/834 |
| 3,555,111 | 1/1971 | Benham | 260/830 |

OTHER PUBLICATIONS

Chem. Abst., Vol. 67, 1967, p. 22429g.

*Primary Examiner*—Melvin Goldstein
*Assistant Examiner*—T. Pertilla
*Attorney, Agent, or Firm*—James G. Carter

[57] ABSTRACT

Solid epoxy resins are prepared from diglycidyl ethers of a hydrogenated bisphenol such as hydrogenated bisphenol A and a dicarboxylic acid such as isophthalic acid. These solid resins may be comminuted into a stable free-flowing powder useful as epoxy resin powder coatings having excellent weathering properties.

26 Claims, No Drawings

SOLID EPOXY RESINS FROM HYDROGENATED BISPHENOLS AND AROMATIC DICARBOXYLIC ACIDS

This application is a continuation-in-part of my previous application Ser. No. 366,389, filed June 4, 1973.

This invention relates to epoxy resins and more particularly it relates to epoxy resins which are useful as powder coatings for outdoor service.

Higher molecular weight epoxy resins suitable for powder coatings usually have a Durran's softening point of from about 80° to about 120°C and above and have usually been prepared form glycidyl ethers of bisphenols and bisphenols. However, such resins possess poor weathering characteristics.

A copending application Ser. No. 366,390, filed June 4, 1973, which is a continuation-in-part of application Ser. No. 229,181, filed Feb. 24, 1972 now abandoned, discloses epoxy resins prepared from glycidyl ethers of hydrogenated polyhydroxy aromatic compounds and aromatic or cycloaliphatic dicarboxylic acids which possess excellent weathering characteristics.

It has now been unexpectedly discovered that the epoxy resin compositions of the present invention have excellent weathering characteristics and improved physical properties and are suitable for use in epoxy powder coating compositions.

The novel epoxy resin compositions of the present invention comprises a solid product having a softening point above about 80°C and preferably from about 90° to about 120°C and which can be comminuted to a free-flowing stable powder which results from the reaction of a diglycidyl ether of a hydrogenated bisphenol or polyglycidyl ether of a hydrogenated novolac having an average functionality of from about 2.01 to about 2.6, preferably from about 2.01 to about 2.3, and (a) from about 10% to about 25 percent, preferably from about 18 percent to about 22 percent by weight (based upon the total weight of reactants) of an aromatic or cycloaliphatic dicarboxylic acid and (b) from about 1 percent to about 10 percent, preferably from about 2 percent to about 4 percent by weight (based upon the total weight of reactants) of an aliphatic dicarboxylic acid having from about 4 to about 10 carbon atoms or the acid terminated adducts of an aromatic or cycloaliphatic dicarboxylic acid or anhydride thereof with an aliphatic dihydroxyl containing compound represented by the general formulas

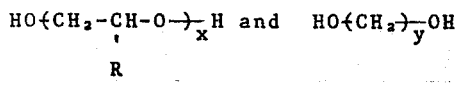

wherein R is independently hydrogen, methyl ethyl, chloromethyl, bromomethyl or iodomethyl, $x$ has a value of from 1 to about 3, preferably from 1 to 2 and $y$ has a value of from 3 to about 10, preferably from about 3 to about 4; wherein the quantities of the glycidyl ether and the dibasic acid or said adduct is such as to provide an epoxy:COOH ratio of from about 1.1:1 to about 2.0:1, preferably from about 1.1:1 to about 1.8:1, and most preferably from about 1.3:1 to about 1.5:1.

The term free-flowing stable powder used herein means that the epoxy resin when ground or otherwise comminuted into a free flowing powder will remain free flowing for at least 48 hours.

The novel epoxy resin compositions of the present invention are readily prepared by reacting a diglycidyl ether of a hydrogenated bisphenol or hydrogenated novolac with an aromatic or cycloaliphatic dibasic acid at a temperature of from about 80° to about 210°C in the presence of a suitable catalyst such as tertiary amines, quaternary ammonium compounds, quaternary phosphonium compounds, or the like, for a time sufficient to produce the product, usually from about 0.5 to about 30 hours. It is usually desirable, particularly when laboratory apparatus is employed, to preblend all of the reactants and then add the catalyst thereto.

Suitable catalysts include, for example, quaternary ammonium compounds such as benzyl trimethyl ammonium chloride, amines such as N-methylmorpholine and phosphonium compounds such as those compounds disclosed in U.S. Pat. No. 3,477,990 and Canadian Pat. No. 893,191.

Suitable glycidyl ethers of a hydrogenated bisphenol include the glycidyl ethers of such hydrogenated bisphenols such as, for example, hydrogenated p,p'-isopropylidine-diphenol, hydrogenated p,p'-methylenediphenol, hydrogenated dihydroxydiphenyl sulfone, hydrogenated 4,4'-dihydroxy biphenyl, hydrogenated 4,4'-dihydroxydiphenyl oxide, mixtures thereof and the like.

Suitable hydrogenated polyglycidyl ethers of novolac resins include, for example, those represented by the formula

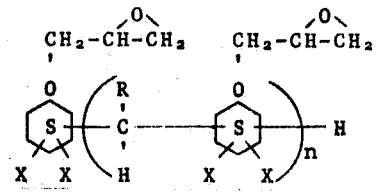

wherein R is independently hydrogen or an alkyl group having from 1 to about 4 carbon atoms, each X is independently hydrogen, chlorine, bromine or an alkyl group having from 1 to about 4 carbon atoms and n has an average value of from about 1.01 to about 1.6, preferably from about 1.01 to about 1.3.

Suitable aromatic carboxylic dibasic acids include phthalic acid, terephthalic acid, isophthalic acid, and those acids represented by the formula

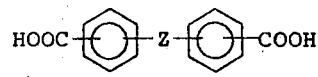

wherein Z is independently selected from a divalent hydrocarbon group having from 1 to 6 carbon atoms,

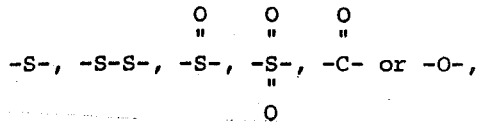

such as, for example, 4,4'-diphenylsulfide dicarboxylic acid, 4,4'-diphenyldisulfide dicarboxylic acid, 2,5-furan dicarboxylic acid, 4,4'-diphenyloxide dicarboxylic acid and mixtures thereof.

Suitable cycloaliphatic dibasic acids include, for example, tetrahydrophthalic acid, methyltetrahydrophthalic acid, hexyltetrahydrophthalic acid, dimethylhexahydrophthalic acid, methylhexahydrophthalic acid, hexylhexahydrophthalic acid, bromotetrahydrophthalic acid, chlorotetrahydroisophthalic acid, chlorendic acid, methyltetrahydroterephthalic acid, mixtures thereof and the like.

Suitable aliphatic dicarboxylic acids include, for example, adipic acid, succinic acid, suberic acid, sebacic acid, mixtures thereof and the like.

Suitable acid terminated adducts of aliphatic dihydroxyl containing compounds with aromatic or cycloaliphatic dicarboxylic acids or anhydrides thereof include, for example, adducts of tetrahydrophthalic anhydride with ethylene glycol, tetrahydrophthalic anhydride with diethylene glycol, tetrahydrophthalic anhydride with 1,4-butanediol, phthalic anhydride with propylene glycol, isophthalic anhydride with dipropylene glycol, mixtures thereof and the like.

In the preparation of the solid epoxy resins of the present invention, the quantities of hydrogenated diglycidyl ether of a bisphenol or novolac and mixture of an aromatic or cycloaliphatic dicarboxylic acid and aliphatic dicarboxylic acid or adduct of an aromatic or cycloaliphatic dicarboxylic acid with an aliphatic diol are such as to provide the resultant solid epoxy resin with a percent epoxide of from about 2 to about 6 and preferably from about 3 to about 4 and a Durran's softening point of at least about 80°C.

The novel epoxy resin compositions of the present invention may be cured to a thermoset product by any of the well known catalysts or curing agents such as primary, secondary and tertiary amines, amides, acid anhydrides and the like.

The quantities of curing agent or catalysts employed depends upon the particular catalyst or curing agent employed and the particular catalyst or curing agent depends upon the properties desired as those skilled in the epoxy resin art are readily aware. Those not so skilled in this art but who desire to make use of this invention are directed to the Handbook of Epoxy Resin, Lee and Neville, McGraw Hill Book Co., 1967.

Although the novel epoxy resins of the present invention are particularly useful in epoxy resin powder coating formulations they may also be employed in molding compositions, admixed with suitable solvents for use in solution coatings, castings, potting compounds, adhesives and the like.

The following examples are illustrative of the present invention but are not to be construed as to limiting the scope thereof in any manner.

EXAMPLES 1–12

In a series of examples, epoxy resins were prepared by adding to a reaction vessel equipped with a means for stirring, temperature control, and nitrogen purge, a preblended mixture of a diglycidyl ether of hydrogenated bisphenol A (DGEHBA) having an average epoxide equivalent weight of about 210, an aromatic dicarboxylic acid or mixture of an aromatic dicarboxylic acid and an aliphatic dicarboxylic acid or adduct of a cycloaliphatic or aromatic dicarboxylic acid anhydride with an aliphatic dihydroxyl-containing compound. The temperature was raised to 100°C and N-methyl morpholine (NMM) was added as a catalyst. Heating was then continued to about 140°–150°C and then allowed to exotherm to a temperature of about 170°C. The reaction mixture was then digested for about 1–3 hours at a temperature of about 150°C. The reactants and results are given in the following Table I.

TABLE I

| COMPONENTS AND PROPERTIES | Example 1 (Comparative) | Example 2 | Example 3 | Example 4 | Example 5 (Comparative) | Example 6 | Example 7 | Example 8 | Example 9 |
|---|---|---|---|---|---|---|---|---|---|
| DGEHBA, grams | 231.6 | 193.3 | 332 | 210 | 211 | 190 | 312 | 312 | 312 |
| Aromatic Acid: | | | | | | | | | |
| type/grams | A[1]/68.4 | A/53.9 | A/87.7 | A/45.1 | A/29.3 | A/53.9 | A/77 | A/79 | A/79 |
| % Aromatic Acid[9] | 22.8 | 21.56 | 20.42 | 16.7 | 10.87 | 21.57 | 19.37 | 19.75 | 19.74 |
| Aliphatic Acid: | | | | | | | | | |
| type/grams | 0 | B[2]/2.8 | B/9.8 | B/15 | B/29.3 | B/6 | C[3]/8.5 | D[4]/9 | E[10]/9.2 |
| % Aliphatic Acid[9] | 0 | 1.12 | 2.28 | 5.55 | 10.87 | 2.4 | 2.14 | 2.25 | 2.3 |
| NMM, grams | 0.23 | 0.2 | 0.33 | 0.2 | 0.2 | 0.2 | 0.3 | 0.3 | 0.3 |
| % Aliphatic Acid based on total wt. of Acid | 0 | 4.94 | 10.05 | 24.96 | 50 | 10.02 | 9.94 | 10.23 | 10.43 |
| Durran's Softening Point, °C | 84 | 83 | 87 | 87 | gelled in reaction vessel | 102 | 87 | 80 | 84 |
| % Epoxide | 3.8 | 3.7 | 3.6 | 3.1 | N.D.[5] | 2 | 3.5 | 3.8 | 3.8 |

| COMPONENTS AND PROPERTIES | Example 10 | Example 11 | Example 12 |
|---|---|---|---|
| DGEHBA, grams | 305 | 304 | 304.2 |
| Aromatic Acid: | | | |
| type/grams | A/76 | A/76.6 | A/76.6 |
| % Aromatic Acid[9] | 23.45 | 19.16 | 19.15 |
| Adduct: | | | |
| type/grams | F[6]/19.1 | G[7]/19.2 | H[8]/19.2 |
| % Adduct[9] | 5.89 | 4.8 | 4.8 |
| NMM, grams | 0.3 | 0.3 | 0.3 |
| % Adduct based on total wt. of acid + adduct | 20.08 | 20.04 | 20.04 |
| Durran's Softening Point, °C | 83 | 85 | 83 |
| % Epoxide | 3.3 | 3.2 | 3.4 |

[1] Aromatic Acid A was isophthalic acid.
[2] Aliphatic Acid B was adipic acid.
[3] Aliphatic Acid C was succinic acid.
[4] Aliphatic Acid D was suberic acid.
[5] N.D. = not determined.
[6] Adduct F was prepared from tetrahydrophthalic anhydride and ethylene glycol in a molar ratio of 2:1 respectively.
[7] Adduct G was prepared from tetrahydrophthalic anhydride and diethylene glycol in a molar ratio of 2:1 respectively.
[8] Adduct H was prepared from tetrahydrophthalic anhydride and 1,4-butanediol in a molar ratio of 2:1 respectively.
[9] % based upon total weight of reactants.
[10] Aliphatic acid E was sebacic acid.

EXAMPLES 13-23

Each of the Examples 1–4 and 6–12 were formulated into a powder coating on a roll mill and electrostatically sprayed onto cold rolled steel Q panels. The coated panels were then baked in an oven at 175°C for 30 minutes. The coating formulation and results are given in the following Table II. Although the ratio of the quantity of curing agent employed to quantity of epoxy resin is different, each quantity of curing agent, trimellitic anhydride (TMA), is 70 percent of stoichiometric.

TABLE II

| COMPONENT | Example 13 (COMPARATIVE) | Example 14 | Example 15 | Example 16 | Example 17 | Example 18 | Example 19 | Example 20 |
|---|---|---|---|---|---|---|---|---|
| Resin, from Example No./grams | 1/200 | 2/200 | 3/250 | 4/200 | 6/200 | 7/200 | 8/200 | 9/200 |
| TMA, grams | 23 | 23 | 28.1 | 20 | 14 | 22 | 24 | 24 |
| TiO$_2$ | 146 | 149 | 186 | 146 | 145 | 148 | 148 | 148 |
| MOD-A-FLOW* | 1.8 | 1.8 | 2 | 1.8 | 1.8 | 1.9 | 1.9 | 1.9 |
| Gardner Reverse Impact, in-lbs. | 10–10 | 30–30 | 80–100 | 100–120 | 10–20 | 30–40 | 60–80 | 60–80 |
| Coating Thickness, mils | 1.2–1.7 | 1.3–1.5 | 1.5 | 1.6 | 1.7–1.5 | 1.3–1.5 | 1.3–1.5 | 1.3–1.5 |

| COMPONENT | Example 21 | Example 22 | Example 23 |
|---|---|---|---|
| Resin, from Example No./grams | 10/262 | 11/262 | 12/262 |
| TMA, grams | 27 | 27% | 27 |
| TiO$_2$ | 192 | 192 | 192 |
| MOD-A-FLOW* | 1.3 | 1.3 | 1.3 |
| Gardner Reverse Impact, in-lbs. | 60 | 50–60 | 60–80 |
| Coating Thickness, mils. | 1.5 | 1.5 | 1.5 |

* MOD-A-FLOW is a flow control agent commercially available from Monsanto Co.

EXAMPLE 24

Panels were coated with the coating composition of Example 15 and baked at 175°C for 30 minutes. These panels were then placed in the atmosphere at Freeport, Texas and periodic reflectance measurements were taken on a Gardner Glossometer at an angle of 60°. The percent reflectance after the time of exposure to the atmosphere is given in Table III.

TABLE III

| Days Exposure | % Reflectance |
|---|---|
| 0 (initial) | 78 |
| 16 | 82 |
| 34 | 87 |
| 56 | 87 |
| 84 | 88 |

It is clearly evident from the above data that the atmosphere does not adversely affect the gloss of the coating.

I claim:

1. A solid epoxy resin having a Durran's softening point of at least 80°C which can be comminuted into a stable, free-flowing powder prepared by reacting
   A. an epoxy resin selected from
      1. a diglycidyl ether of a hydrogenated bisphenol and
      2. a polyglycidyl ether of a hydrogenated novolac having a functionality of from about 2.01 to about 2.6, or
      3. mixtures thereof; with
   B. a mixture consisting of
      1. from about 10 to about 25 percent by weight, based upon the total weight of components (A) and (B), of an aromatic dicarboxylic acid or cycloaliphatic dicarboxylic acid and
      2. from about 1 to about 10 percent by weight, based upon the total weight of components (A) and (B), of
         a. an aliphatic dicarboxylic acid having from 4 to about 10 carbon atoms,
         b. an acid terminated adduct of an aromatic or cycloaliphatic dicarboxylic acid or anhydride with an aliphatic dihydroxyl containing compound represented by the general formulas

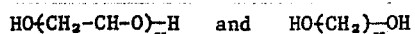

wherein each R is independently hydrogen, methyl, ethyl, chloromethyl, bromomethyl or iodomethyl, $x$ has a value of from 1 to about 3 and $y$ has a value of from 3 to about 10, or
         c. mixtures thereof;
   wherein the quantities of components (A) and (B) are such as to provide the resultant solid epoxy resin with a percent epoxide of from about 2 to about 6 and a softening point of at least 80°C.

2. The solid epoxy resin of claim 1 wherein component (A) is a diglycidyl ether of a hydrogenated bisphenol and component (B1) is an aromatic dicarboxylic acid.

3. The solid epoxy resin of claim 2 wherein percent epoxide is from about 3 to about 4.

4. The epoxy resin of claim 3 wherein component (A) is the digylcidyl ether of hydrogenated bisphenol A.

5. The epoxy resin of claim 3 wherein component (B1) is isophthalic acid and component (B2) is adipic acid, succinic acid, suberic acid or sebacic acid.

6. The epoxy resin of claim 5 wherein component (A) is the diglycidyl ether of hydrogenated bisphenol A.

7. The epoxy resin of claim 3 wherein component (B1) is isophthalic acid and component (B2) is an acid terminated adduct of tetrahydrophthalic anhydride with ethylene glycol, diethylene glycol or 1,4-butanediol.

8. The epoxy resin of claim 7 wherein component (A) is the diglycidyl ether of hydrogenated bisphenol A.

9. A thermosettable composition comprising an epoxy resin of claim 3 and a catalytic amount of a curing catalyst or a curing amount of a curing agent.

10. A thermosettable composition comprising an epoxy resin of claim 4 and a catalytic amount of a curing catalyst or a curing amount of a curing agent.

11. A thermosettable composition comprising an epoxy resin of claim 5 and a catalytic amount of a curing catalyst or a curing amount of a curing agent.

12. A thermosettable composition comprising an epoxy resin of claim 6 and a catalytic amount of a curing catalyst or a curing amount of a curing agent.

13. A thermosettable composition comprising an epoxy resin of claim 7 and a catalytic amount of a curing catalyst or a curing amount of a curing agent.

14. A thermosettable composition comprising an epoxy resin of claim 8 and a catalytic amount of a curing catalyst or a curing amount of a curing agent.

15. An article coated with the composition of claim 9.

16. An article coated with the composition of claim 10.

17. An article coated with the composition of claim 11.

18. An article coated with the composition of claim 12.

19. An article coated with the composition of claim 13.

20. An article coated with the composition of claim 14.

21. The cured composition of claim 9.
22. The cured composition of claim 10.
23. The cured composition of claim 11.
24. The cured composition of claim 12.
25. The cured composition of claim 13.
26. The cured composition of claim 14.

* * * * *